No. 784,942. PATENTED MAR. 14, 1905.
W. HENCKLER.
FISH HOOK.
APPLICATION FILED MAY 10, 1902.
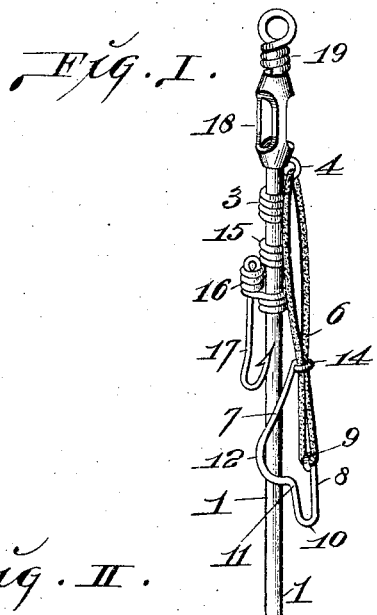
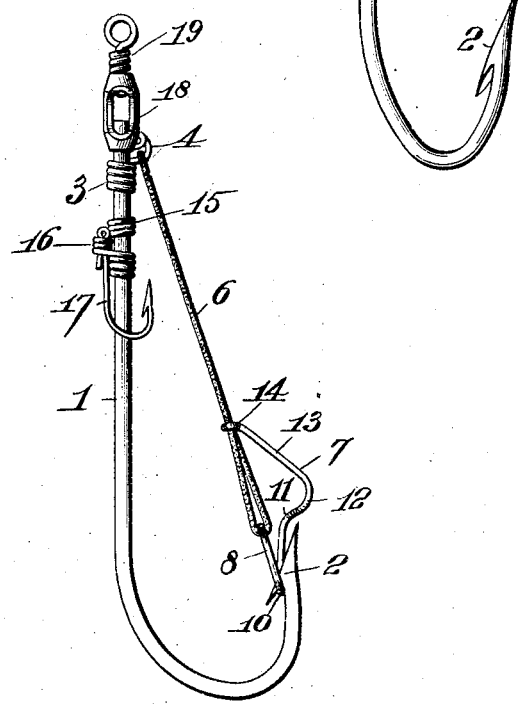
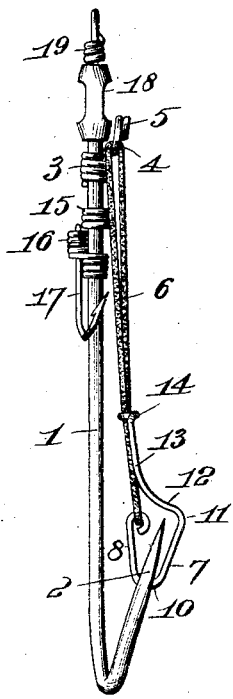
attest:—
M. P. Smith
E. S. Knight
Inventor:—
Wm. Henckler:—
By Knight Bro's
atty's No. 784,942.

Patented March 14, 1905.

UNITED STATES PATENT OFFICE.

WILLIAM HENCKLER, OF ST. LOUIS, MISSOURI.

FISH-HOOK.

SPECIFICATION forming part of Letters Patent No. 784,942, dated March 14, 1905.

Application filed May 10, 1902. Serial No. 106,666.

*To all whom it may concern:*

Be it known that I, WILLIAM HENCKLER, a citizen of the United States, residing in the city of St. Louis, in the State of Missouri, have invented certain new and useful Improvements in Fish-Hooks, of which the following is a full, clear, and exact description, reference being had to the accompanying drawings, forming part of this specification.

My invention relates to means for guarding the prong of a fish-hook to prevent the prong from becoming caught in debris or objects of any character while the fish-hook is in use in water.

It also relates to means whereby the spring applied to the prong-guard is adjustably held on the shank of the hook.

My invention consists in features of novelty hereinafter fully described, and pointed out in the claims.

Figure I is a perspective view of my hook with the prong-guard shown disengaged from the prong. Fig. II is a side view of the hook with the prong-guard shown in engagement with the prong. Fig. III is a front view of the hook with the guard in engagement with the prong.

1 designates the shank of my fish-hook provided with a prong 2.

3 designates a slide, preferably formed of wire, that encircles the shank 1 of the hook and is provided with an outturned arm 4, that terminates in a coil 5. The slide 3 is adapted to be moved longitudinally on the hook-shank, but is fitted thereto with a sufficient degree of tightness to cause it to remain in a set position by frictional contact with the shank.

6 is a spring, preferably in the form of an elastic loop, that is applied to the arm of the slide 3.

7 designates a prong-guard having a short arm 8, that is provided with an eye 9, by which said arm is connected to the lower end of the spring 6. The arm 8 leads from its attachment to the spring 6 downwardly to a socket-bend 10 and then upwardly to a bend 11, from which last-named bend it curves in a transverse direction to produce an outturned portion 12, that will overhang the point of the fish-hook prong 2 when the guard is applied thereto, as seen in Figs. II and III. From the outturned portion the guard extends upwardly to the termination of a long arm 13, that is provided with an eye 14, by which the upper end of the guard is connected to the spring 6. In the use of the guard it is positioned over the prong of the hook, as seen most clearly in Fig. II, the socket-bend 10 of the guard being seated within the spur of the prong 2. When the socket-bend is so seated, the vertical portions of the guard extend upwardly at each side of the prong 2 and the outturned portion 12 is maintained directly over the point of the prong, so as to protect it and prevent its catching into any object that may be encountered in the water in which the hook is being used. By adjusting the slide 3 on the shank of the hook the tension of the spring 6 may be increased or diminished, as desired, to hold the guard firmly to the prong of the hook.

15 designates a bait-hook-receiving slide movably positioned on the hook-shank 1 and provided with a loop 16, that is adapted to receive the bait-hook 17, which by the movement of the slide on the shank may be positioned at any desired distance from the prong end of the hook, the shank of said bait-hook being bent backwardly upon itself to provide a spring-key by which the bait-hook is maintained in the loop of the slide 15. (See Fig. II.)

18 designates a swivel-head fixed to the hook-shank 1, and 19 is a swivel-eye loosely positioned in said swivel-head. This construction provides a swivel that permits free rotation of the fish-hook without the fish-line to which the swivel-eye is connected becoming twisted by the rotation or swirling of the fish-hook in the water.

From the foregoing it will be seen that when the fish-hook is in use the guard 7 may remain constantly in position over the prong of the hook to serve as a protection therefor against the hook being caught into objects encountered. When, however, a fish takes the hook in its mouth the guard is readily thrown out of engagement with the prong by the closing of the fish's mouth, thereby leaving the prong unobstructed for service in the usual manner.

I claim as my invention—

1. The combination with a fish-hook having a prong, of a guard constructed to be applied to said prong and overhang the point of the hook, and means for holding said guard to said prong, substantially as described.

2. The combination with a fish-hook having a prong, of a guard constructed to be detachably applied to said prong, and overhang the point of the hook, and a spring whereby said guard is connected to the shank of the fish-hook, substantially as described.

3. The combination with a fish-hook having a prong, of a guard constructed to be detachably applied to said prong and overhang the point of the hook, a slide movably mounted on the shank of said hook, and a spring connecting said guard to said slide, substantially as described.

4. The combination with a fish-hook, having a prong, of a guard having a socket portion adapted to engage the spur of said prong, an outturned portion adapted to overhang the point of the prong, and a spring whereby said guard is connected to the shank of said hook, substantially as described.

WM. HENCKLER.

In presence of—
  E. S. KNIGHT,
  M. P. SMITH.